United States Patent
Song et al.

(10) Patent No.: US 11,920,991 B2
(45) Date of Patent: Mar. 5, 2024

(54) SENSING DEVICE AND ELECTROMAGNETIC DEVICE SYSTEM INCLUDING THE SAME

(71) Applicant: Tyco Electronics (Shanghai) Co. Ltd., Shanghai (CN)

(72) Inventors: Yuming Song, Shanghai (CN); Shaoyong Wang, Shanghai (CN); Mingjie Fan, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 642 days.

(21) Appl. No.: 16/923,743

(22) Filed: Jul. 8, 2020

(65) Prior Publication Data
US 2021/0010872 A1   Jan. 14, 2021

(30) Foreign Application Priority Data

Jul. 11, 2019   (CN) .......................... 201910625080.2

(51) Int. Cl.
*G01K 7/36* (2006.01)
*G01K 7/00* (2006.01)
(Continued)

(52) U.S. Cl.
CPC .................. *G01K 7/36* (2013.01); *G01K 7/00* (2013.01); *G01D 21/02* (2013.01); *G01K 1/024* (2013.01);
(Continued)

(58) Field of Classification Search
CPC .. H02J 5/005; H02J 7/025; H02J 7/045; H02J 50/10; G01K 17/04; G01K 7/36; G01K 7/00; G01K 1/024; G01K 2207/06; B60L 11/87; B60L 1/18; G01D 21/02; G08C 17/02; H05B 6/062; H05B 6/12; H05B 6/1209; H05B 6/1236

See application file for complete search history.

(56) References Cited

U.S. PATENT DOCUMENTS 3,887,781 A * 6/1975 Peters, Jr. ................. G05F 1/56
219/502
5,266,765 A * 11/1993 Storm ....................... H05B 6/06
219/640

(Continued)

FOREIGN PATENT DOCUMENTS

EP         3143915 A1     3/2017

OTHER PUBLICATIONS

Examination Report from the European Patent Office dated Dec. 7, 2022, corresponding to Application No. 20 185 289.4-1001, 6 pages.

Primary Examiner — Nathaniel T Woodward
Assistant Examiner — Philip L Cotey
(74) Attorney, Agent, or Firm — Barley Snyder

(57) ABSTRACT

A sensing device includes a sensing module configured to obtain a measurement data of an object to be measured, a first processing module coupled to the sensing module and configured to receive the measurement data of the object to be measured from the sensing module, and a power module coupled to the sensing module and the first processing module. The power module is configured to produce a supply voltage based on a magnetic field generated by an electromagnetic device to power the sensing module and the first processing module.

26 Claims, 5 Drawing Sheets

(51) Int. Cl.
  *H02J 50/10* (2016.01)
  *G01D 21/02* (2006.01)
  *G01K 1/024* (2021.01)
  *G08C 17/02* (2006.01)
  *H05B 6/06* (2006.01)
  *H05B 6/12* (2006.01)

(52) U.S. Cl.
  CPC ......... *G01K 2207/06* (2013.01); *G08C 17/02* (2013.01); *H02J 50/10* (2016.02); *H05B 6/062* (2013.01); *H05B 6/12* (2013.01); *H05B 6/1209* (2013.01); *H05B 6/1236* (2013.01)

(56) References Cited

U.S. PATENT DOCUMENTS

| | | | | |
|---|---|---|---|---|
| 6,348,677 B2* | 2/2002 | Aurre | ...................... | H05B 3/746 |
| | | | | 219/448.11 |
| 11,000,151 B2* | 5/2021 | Furrer | ................. | A47J 36/2433 |
| 2009/0147824 A1* | 6/2009 | Schafer | .................... | G01K 5/18 |
| | | | | 374/183 |
| 2010/0000980 A1* | 1/2010 | Popescu | .............. | A47J 36/2466 |
| | | | | 219/201 |
| 2011/0127847 A1* | 6/2011 | Shih | ........................ | H02J 50/10 |
| | | | | 307/104 |
| 2012/0000903 A1* | 1/2012 | Baarman | ............... | H05B 6/1236 |
| | | | | 219/620 |
| 2012/0235508 A1* | 9/2012 | Ichikawa | ............. | H04B 5/0087 |
| | | | | 307/104 |
| 2012/0305546 A1* | 12/2012 | Filippa | ................... | H05B 6/062 |
| | | | | 219/660 |
| 2014/0305930 A1* | 10/2014 | Heizer | ................... | G01K 1/024 |
| | | | | 219/544 |
| 2015/0013549 A1* | 1/2015 | Yaman | ................ | H05B 6/1236 |
| | | | | 99/358 |
| 2015/0245723 A1* | 9/2015 | Alexander | ........... | A47J 39/025 |
| | | | | 219/387 |
| 2016/0336802 A1* | 11/2016 | Kobayashi | .............. | H02J 50/10 |
| 2017/0138797 A1* | 5/2017 | Brown | ..................... | G01K 1/14 |
| 2017/0150841 A1* | 6/2017 | Johncock | .............. | G05B 15/02 |
| 2017/0280510 A1* | 9/2017 | Kim | ....................... | A47J 36/321 |
| 2017/0338685 A1* | 11/2017 | Jung | ...................... | H02J 50/90 |
| 2018/0116457 A1* | 5/2018 | Mills | ................... | H05B 6/1209 |
| 2019/0041271 A1* | 2/2019 | Preston | ................. | G01K 1/026 |
| 2019/0104570 A1* | 4/2019 | Moon | ................... | H05B 6/362 |
| 2019/0184842 A1* | 6/2019 | Waters | ................... | B60L 53/12 |
| 2019/0341797 A1* | 11/2019 | Floresca | ................ | H02J 50/12 |
| 2020/0144867 A1* | 5/2020 | Sultenfuss | .............. | H02J 50/10 |
| 2020/0351991 A1* | 11/2020 | Nam | ..................... | H05B 6/062 |

* cited by examiner

SENSING DEVICE AND ELECTROMAGNETIC DEVICE SYSTEM INCLUDING THE SAME

CROSS-REFERENCE TO RELATED APPLICATION

This application claims the benefit of the filing date under 35 U.S.C. § 119(a)-(d) of Chinese Patent Application No. 201910625080.2, filed on Jul. 11, 2019.

FIELD OF THE INVENTION

The present invention relates to a sensing device and, more particularly, to a sensing device for an electromagnetic device.

BACKGROUND

Electromagnetic devices, such as an induction cooktop, are widely used as cooking appliances. During the cooking process, it is advantageous to obtain the temperature of the food in the pot used with the electromagnetic device or the temperature of the cooking medium (for example, water or oil) of the food. Generally, the temperature of the food or the temperature of the cooking medium of the food is measured in the following manner:

1) When the electromagnetic device is used for cooking food, the food radiates heat to the panel of the induction cooktop through the bottom of the pot. Thus, a sensor may be disposed below the panel for detecting the temperature of the panel, which may be used as the temperature of the food or the temperature of the cooking medium of the food. Meanwhile, the sensor is provided with the required power supply voltage by the electromagnetic device.

2) A sensing device (e.g. a temperature probe) directly contacts with the food or the cooking medium of the food, and the detected temperature may be used as the temperature of the food or the temperature of the cooking medium of the food. Meanwhile, the sensing device is provided with the required power supply voltage by a battery or batteries.

Although the currently used temperature measurement methods can directly or indirectly measure the temperature of the food or the temperature of the cooking medium of the food, there exist many problems. For example, in the first manner described above, the heat conduction of the panel has latency, and the heat transfer effect of heat radiation is poor, resulting in the latency and insufficient accuracy of the measured temperature. Additionally, it is inconvenient to use the connection with the electromagnetic device to provide the power supply voltage. In the second manner described above, since the batteries (no matter dry batteries or storage batteries) cannot withstand high temperatures and contain compositions of toxic metal, and the sensing device needs to be in direct contact with the food or the cooking medium of the food, it is easy to pollute the food. Therefore, the application and usage environment of the sensing device containing a battery or batteries have great limitations.

SUMMARY

A sensing device includes a sensing module configured to obtain a measurement data of an object to be measured, a first processing module coupled to the sensing module and configured to receive the measurement data of the object to be measured from the sensing module, and a power module coupled to the sensing module and the first processing module. The power module is configured to produce a supply voltage based on a magnetic field generated by an electromagnetic device to power the sensing module and the first processing module.

BRIEF DESCRIPTION OF THE DRAWINGS

The invention will now be described by way of example with reference to the accompanying Figures, of which.

DETAILED DESCRIPTION OF THE EMBODIMENT(S)

The implementation and use of specific embodiments are described in detail below. However, it should be understood that the discussed specific embodiments are merely illustrative of specific ways to implement and use the disclosure, and do not mean to limit the scope of the disclosure. In the description, the structural positions of the various components, such as up, down, top, bottom and other expressions of directions, are not absolute, but relative. When the various components are arranged as shown in the figures, these directional expressions are appropriate, but when the positions of the various components in the figures change, these directional expressions also change accordingly. As used herein, "connected" or "connect to" and similar words are not limited to physical or mechanical connections, but may include electrical connections, whether direct or indirect. "First", "second" and similar words do not indicate any order, quantity or importance, but are only used to distinguish different components. Similarly, words such as "one", "a" or "an" do not mean any quantity limitation, but mean that there is at least one.

As used herein, the terms "including", "includes", "comprising", "comprises" and similar terms are open terms, that is, "including/includes but not limited to", which means that other contents can also be included. The term "based on" is "based at least in part on"; the term "one embodiment" means "at least one embodiment"; the term "another embodiment" means "at least one other embodiment" and so on. In this specification, the example expressions of the above terms do not necessarily refer to the same embodiment or example. Moreover, the described specific features, structures, materials, or characteristics may be combined in any suitable manner in any one or more embodiments or examples. In addition, those skilled in the art may combine and integrate different embodiments or examples and features of the different embodiments or examples described in this specification without contradicting each other.

Techniques, methods, and devices known to those of ordinary skill in the related art may not be discussed in detail, but where appropriate, the techniques, methods, and devices should be considered as part of the specification.

The connection between the modules in the figures is only for the convenience of description, which means that at least the modules at both ends of the connection are in communication with each other, and is not intended to limit the unconnected modules from communicating.

Hereinafter, various embodiments of the present disclosure will be described in detail using FIGS. 1-7 as examples.

Figure 1:
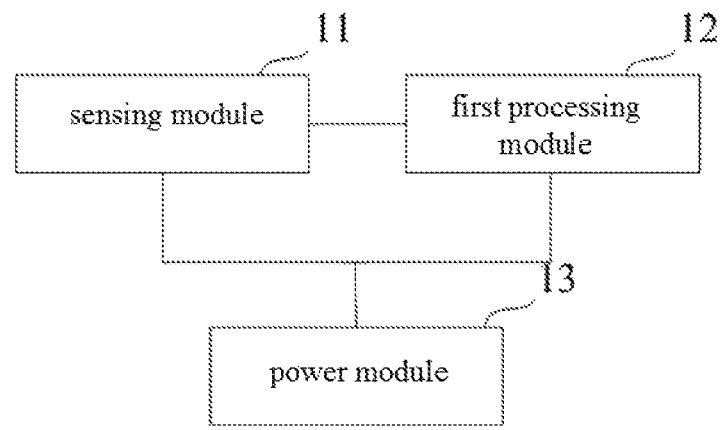
FIG. 1 is a block diagram of a sensing device according to an embodiment.

FIG. 1 shows a circuit block diagram of a sensing device 10 according to an embodiment of the present disclosure. Referring to FIG. 1, the sensing device 10 includes a sensing module 11, a first processing module 12, and a power module 13. The sensing module 11 is used for obtaining measurement data of an object to be measured. In some embodiments, the sensing device 10 may be a stand-alone sensing device. The stand-alone sensing device helps to increase the convenience of manufacturing and usage, reduce manufacturing costs, and expand the scope of application of sensor device.

The sensing module 11 can sense the physical quantity of interest of the object to be measured as needed, such as temperature, concentration (when the object to be measured is liquid), pressure, humidity, etc., and is able to transform the sensed information into electrical signals or other forms of information for output in certain rules. In some embodiments, the sensing module 11 includes at least one sensing element. In some embodiments, the measurement data of the object to be measured is temperature data of the object to be measured, and the sensing element is a thermocouple or a thermal resistance.

With continued reference to FIG. 1, a first processing module 12 is coupled to the sensing module 11, and receives the measurement data of the object to be measured from the sensing module 11 for further processing. In some embodiments, the sensing device 10 may further include a first communication module (not shown in FIG. 1). The first communication module may receive the measurement data of the object to be measured from the first processing module 12 and use any suitable communication manner (e.g., wired or wireless) to send the measurement data of the object to be measured to a second communication module that communicates with it. The second communication module may be disposed within other devices. These devices may include but are not limited to electromagnetic devices, servers, handheld devices, smartphones, and so on. Other devices can use the measurement data of the object to be measured to achieve specific functions, including but not limited to operations such as display, storage, recording, and control.

In some embodiments, the first processing module 12 sends the measurement data of the object to be measured to the second communication module of the electromagnetic device via the first communication module. After receiving the measurement data from the first communication module, the second communication module sends the measurement data to a second processing module of the electromagnetic device which is coupled with the second communication module. The second processing module may perform certain operations according to the measurement data of the object to be measured. In some embodiments, the second processing module may adjust the magnitude of the alternating current flowing through its heating coil based on the measurement data (e.g., temperature data or concentration data) of the object to be measured, thereby adjusting the intensity of the magnetic field to control the heating level of the object to be measured. In other embodiments, the second processing module may send a visual or audible alarm/warning, show the comparison result and recommended operations on the display interface of the cooktop, or push relevant messages to the client of the handheld device or smartphone via a server, and so on, in accordance with the comparison between the measurement data and preset threshold values.

In some embodiments, the first communication module and the second communication module are wireless communication modules, which can communicate in any type of wireless communication manner, including but not limited to Bluetooth, infrared, NFC, ZigBee, mobile cellular network, WiFi and so on.

In other embodiments, the first processing module 12 sends the measurement data of the object to be measured to the second communication module of the server via the first communication module. After receiving the measurement data from the first communication module, the second communication module sends the measurement data to a processor or a control unit of the server. The processor or the control unit may establish a label for the object to be measured, and store the measurement data for data collection, user persona, pushing related messages to the client, or controlling the electromagnetic device and the like.

In other embodiments, the first processing module 12 sends the measurement data of the object to be measured to the second communication module of the handheld device or the smartphone via the first communication module. After receiving the measurement data from the first communication module, the second communication module sends the measurement data to a processor or a control unit of the handheld device or smartphone. The processor or the control unit can display the measurement data of the object to be measured on the display interface of the handheld device or smartphone, compare it with the pre-stored threshold to determine whether the threshold is exceeded, or send a visual/audible alarm/warning in accordance with the comparison result, and so on.

In addition, in some other embodiments, the first processing module 12 can first perform some processing on the measurement data of the object to be measured. The processing of the measurement data by the first processing module 12 may include but is not limited to: storing the measurement data of the object to be measured in the memory of the sensing device 10, comparing the measurement data of the object to be measured with a pre-stored threshold to determine whether the threshold is exceeded, sending or showing an alarm/warning in accordance with the comparison result, or displaying the measurement data of the object to be measured on the display interface of the sensing device 10, and so on. After the first processing module 12 processes the measurement data of the object to be measured, the first processing module 12 may also send the measurement data of the object to be measured or the processing results (e.g., comparison result) to other devices via the first communication module. In some other embodiments, the sensing device 10 also may not include a first communication module, only the first processing module 12 performs the above-described processes on the measurement data of the object to be measured.

As shown in FIG. 1, the sensing device 10 further includes a power module 13. The power module 13 is coupled to the sensing module 11 and the first processing module 12, and produces a supply voltage based on a magnetic field from an electromagnetic device, which is used to power the sensing module 11 and the first processing module 12. The magnetic field is generated by the electromagnetic device during heating. The electromagnetic device can heat the object to be measured, and can also heat other object other than the object to be measured, as long as a magnetic field is generated during the heating process.

In some embodiments, the power module 13 includes a first inductance coil, and the electromagnetic device includes a second inductance coil energized to generate a magnetic field, and the first inductance coil is inductively coupled with the second inductance coil to generate a supply voltage. It should be noted that once the power module 13 produces a supply voltage, it is supplied to the sensing module 11 and the first processing module 12, the electric energy is not stored or is only stored temporarily. In addition, in the embodiment where the electromagnetic device includes the first communication module, the power module 13 also supplies power to the first communication module.

In some embodiments, the electromagnetic device may be an induction cooktop used in a kitchen. After the pot is placed on the induction cooktop, a high frequency alternating magnetic field will be generated when a high frequency alternating current is passed through the heating coil of the induction cooktop. The magnetic force line cuts the pot and forms an eddy current in the pot to heat the pot and thereby cook food. The power module 13 produces a supply voltage based on the magnetic field generated during the process of the induction cooktop heating the pot, so as to power the sensing module 11 and the first processing module 12. Specifically, the first inductance coil of the power module 13 is inductively coupled with the second inductance coil (i.e., heating coil) of the induction cooktop to produce an induced voltage as the supply voltage.

In some other embodiments, the electromagnetic device may be an electromagnetic heating device used in a laboratory for heating chemicals such as solutions in experiments. The power module 13 produces a supply voltage based on the magnetic field generated during the process of the electromagnetic heating device heating the solutions, so as to power the sensing module 11 and the first processing module 12. Specifically, the first inductance coil of the power module 13 is inductively coupled with the second inductance coil (i.e., heating coil) of the electromagnetic heating device to produce an induced voltage as the supply voltage.

In addition, in some embodiments, the power module 13 may further include a signal processing unit (not shown), the signal processing unit is used to process the supply voltage before powering the sensing module 11 and the first processing module 12, and the processing may include at least one of rectification, filtering, and voltage transformation. In some embodiments, after producing the supply voltage based on a magnetic field from the electromagnetic device, the supply voltage is rectified, filtered and transformed via the signal processing unit to generate a desired DC voltage as required. In other embodiments, the processing of the supply voltage may include any one of rectification, filtering, and voltage transformation, or any combination thereof.

In some embodiments, as described above, the second processing module of the electromagnetic device adjusts the magnitude of the alternating current passing through the second inductance coil of the electromagnetic device according to the measurement data of the object to be measured, in order to adjust the heating level of the object to be measured. In the case that the intensity of the magnetic field generated by the second inductance coil of the electromagnetic device changes, the induced voltage generated by the first inductance coil of the sensing device 10 will also change accordingly. In such an embodiment, the electromagnetic device may include a DC-DC transforming circuit to transform the induced voltage into a desired voltage value to provide a stable supply voltage for the sensing module 11 and the first processing module 12.

By the way of generating a supply voltage based on the magnetic field of the electromagnetic device by the power module 13 and supplying power to the sensing module 11 and the first processing module 12, the supply voltage can be provided without any built-in battery or connection with the power supply, which avoids the safety and limitations brought by using the battery and increases convenience. In addition, by using the magnetic field generated by the electromagnetic device during the heating process to produce the supply voltage, there is no need to add an additional power source (for example, a radio frequency apparatus) or modify the original coil of the electromagnetic device (for example, using the magnetic resonance of the coil) at the electromagnetic device. Therefore, there is no additional cost, and also additional electromagnetic radiation will not be induced. In addition, the health of the user will not be endangered and the electromagnetic compatibility (EMC) certification will not be affected, and thus a good EMC is achieved.

Figure 2:
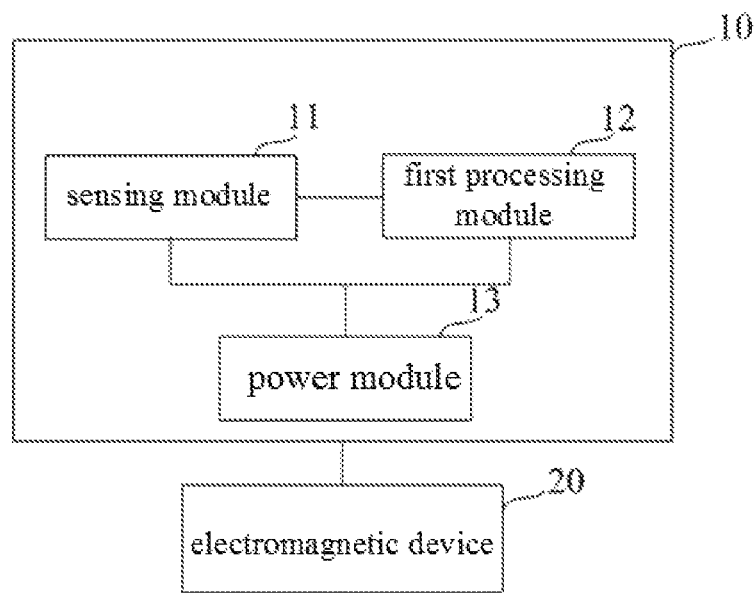
FIG. 2 is a block diagram of an electromagnetic device system according to an embodiment.

FIG. 2 shows a circuit block diagram of an electromagnetic device system 100 according to an embodiment of the present disclosure. As shown in FIG. 2, the electromagnetic device system 100 includes a sensing device 10 and an electromagnetic device 20. The electromagnetic device 20 generates a magnetic field during heating. The electromagnetic device 20 can be used to heat the object to be measured, and can also heat other objects other than the object to be measured, as long as a magnetic field is generated during the heating process. The sensing device 10 includes a sensing module 11, a first processing module 12, and a power module 13. The sensing module 11 is used to obtain measurement data of the object to be measured. In some embodiments, the sensing module 11 includes at least one sensing element. In some embodiments, the measurement data of the object to be measured is temperature data of the object to be measured. In such an embodiment, the at least one sensing element includes a thermocouple or thermal resistance for sensing the temperature of the object.

The first processing module 12 of the sensing device 10 is coupled to the sensing module 11, and receives the measurement data of the object to be measured from the sensing module 11 for further processing. The power module 13 of the sensing device 10 is coupled to the sensing module 11 and the first processing module 12, and generates a supply voltage which is used for powering sensing module 11 and the first processing module 12, based on the magnetic field generated by the electromagnetic device 20.

In some embodiments, the power module 13 of the sensing device 10 includes a first inductance coil (not shown), and the electromagnetic device 20 includes a second inductance coil (not shown). The second inductance coil is a heating coil of the electromagnetic device 20. During operation, a high frequency alternating current passes through the second inductance coil, so that the second inductance coil generates a high frequency alternating magnetic field to form a vortex current in the container heated by the electromagnetic device 20, which causes the container to heat up. The first inductance coil of the sensing device 10 is inductively coupled with the second inductance coil of the electromagnetic device 20 to generate an induced voltage as a supply voltage.

In some embodiments, the power module 13 further includes a signal processing unit that can be used to perform at least one of rectification, filtering and voltage transformation on the supply voltage before the supply voltage is provided to power the sensing module 11 and the first processing module 12. In some embodiments, the sensing device 10 is a stand-alone sensing device. The stand-alone sensing device helps to increase the convenience of manufacturing and usage, reduce manufacturing costs, and expand the scope of application of sensing device.

In some embodiments, the sensing apparatus 10 further includes a first communication module (not shown), which is coupled with the first processing module 12 and the power module 13 and powered by the supply voltage generated by the power module 13. The first communication module is used to receive the measurement data of the object to be measured from the first processing module 12 and send the measurement data to a second communication module (not shown). The electromagnetic device 20 is used to heat the object to be measured, and includes the second communication module. The second communication module is used to receive the measurement data of the object to be measured from the first communication module. The electromagnetic device 20 further includes a second processing module (not shown) coupled to the second communication module. The second processing module is used to receive the measurement data of the object to be measured from the second communication module and adjust the intensity of the magnetic field based on the measurement data to control the heating level of the object to be measured. In some embodiments, the first communication module and a second communication module are wireless communication modules, which can communicate in any type of wireless communication manner, including but not limited to, Bluetooth, infrared, NFC, the ZigBee, a mobile cellular network, WiFi and the like.

The foregoing only lists some of the embodiments of the electromagnetic device system 100 of FIG. 2. It should be appreciated that the components and the functions of the sensing device 10 and the sensing module 11, a first processing module 12 and the power module 13 in FIG. 2 are the same as the sensing device 10 and the corresponding modules in FIG. 1. Therefore, the various embodiments of the sensing device 10 described with respect to FIG. 1 are also applicable to the sensing device 10 of the electromagnetic device system 100 of FIG. 2. In addition, the various embodiments of the electromagnetic device described with respect to FIG. 1 are also applicable to the electromagnetic device 20 of the electromagnetic device system 100 of FIG. 2. For simplicity, other embodiments of the sensing device 10 and the electromagnetic device system 100 will not be described here.

Figure 3:
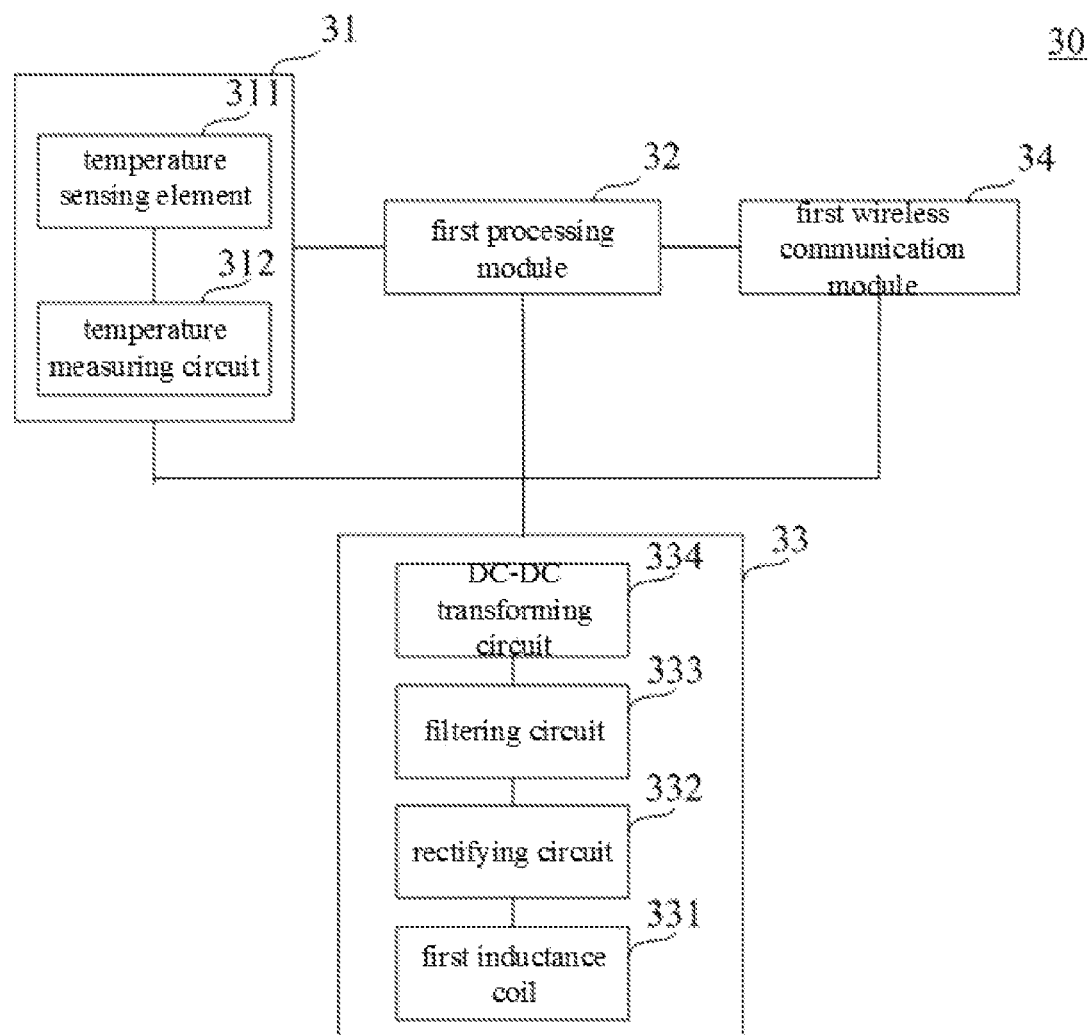
FIG. 3 is a block diagram of a sensing device according to an embodiment.
Figure 4:
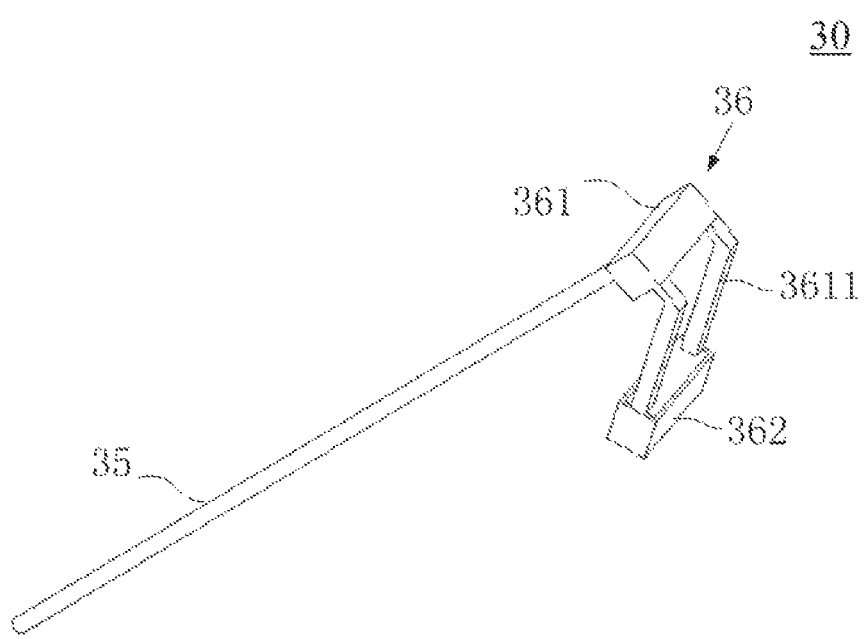
FIG. 4 is a perspective view of the sensing device of FIG. 3.

In the following, the sensing device of the present disclosure is described in specific embodiments with reference to FIGS. 3 and 4. FIG. 3 shows a circuit block diagram of the sensing device 30 according to this embodiment. FIG. 4 shows a perspective view of the sensing device 30 according to this embodiment. In this embodiment, the sensing device 30 is used with an induction cooktop used in a kitchen to measure the temperature of the food being cooked by the induction cooktop or the temperature of the cooking medium of the food to adjust the heating power of the induction cooktop in real time.

In the embodiment shown in FIGS. 3 and 4, the second inductance coil (i.e., the heating coil) of the induction cooktop generates an alternating magnetic field after being energized to heat the pot placed thereon. The power module 33 of the sensing device 30 includes a first inductance coil 331, a rectifying circuit 332, a filtering circuit 333, and a DC-DC transforming circuit 334. The first inductance coil 331 is inductively coupled with a second inductance coil of the induction cooktop during the heating process by the induction cooktop, to collect energy from the magnetic field, thus produces an induced voltage. Then, the rectifying circuit 332, the filtering circuit 333 and the DC-DC transforming circuit 334 rectifies, filters and transforms the induced voltage, and then the induced voltage is converted to a desired DC supply voltage, and powers the sensing module 31, a first processing module 32 and the first wireless communication module 34 of the sensing device 30. In the present embodiment, the rectifying circuit 332 may be a full bridge rectifier consisting of four diodes, the filtering circuit 333 may be a $\mu F$ level capacitor, and the DC-DC transforming circuit 334 may be a general-purpose DC-DC converter chip. In other embodiments, the rectifying circuit 332, the filtering circuit 333 and the DC-DC transforming circuit 334 can use other types of circuitry, as long as their functions can be realized.

As shown in FIG. 3, the sensing module 31 of the sensing device 30 includes at least one temperature sensing element 311. The temperature sensing element 311 may have any form, such as a thermocouple or a thermal resistance, for sensing the current temperature of the food being cooked or the cooking medium (e.g., water or oil) of the food. For example, the temperature sensing element 311 may be disposed in the interior part of a piece of meat being cooked and measures the temperature inside the meat, so that the temperature of the meat can reach a desired temperature value around which the meat can be cooked thoroughly without being burnt and maintain a good taste. As another example, the temperature sensing element 311 may be disposed in the water for steaming fish, and measure the temperature of the water, so that the temperature of water can reach a desired temperature value around which the fish can be steamed thoroughly. In the present embodiment, the temperature sensing element 311 may be a NTC (negative temperature coefficient) resistor. In other embodiments, the temperature sensing element 311 may be a PTC (positive temperature coefficient) resistor or other temperature sensing element such as a thermocouple.

In some embodiments, there may be more than one the temperature sensing element 311. For example, there may be two temperature sensing elements 311, one is placed in the interior part of meat being cooked for measuring the temperature inside the meat, and the other is placed on the surface of the piece of meat for measuring the temperature of the surface of the meat. As another example, one of the two temperature sensing elements 311 is placed inside the food being cooked for measuring the temperature inside the food, and the other is placed in the oil for frying the food to measure the temperature of the oil. In this arrangement, the temperatures of the surface and the interior of the food or the temperatures of the food and its cooking medium can be measured at the same time, which can better reflect the current cooking state of the food and more accurate food temperature can be provided to the induction cooktop, so that the induction cooktop can control the heating power more accurately.

With continued reference to FIG. 3, the sensing module 31 may further include a temperature measuring circuit 312 coupled with the temperature sensing element 311. The temperature sensed by the temperature sensing element 311 may be embodied in a desired form of electrical signal (e.g., voltage value) through signal processing such as amplification and analog to digital conversion to be used as the measurement data.

The first processing module 32 is coupled with the sensing module 31, and controls the frequency of temperature sensing of the sensing module 31. The frequency of temperature sensing can be set according to actual needs. In this embodiment, the sensing module 31 can be controlled to perform temperature measurement every 3 s to 4 s. Each time the sensing module 31 measures a temperature data, it sends the temperature data to a first processing module 32. After receiving the temperature data of the object to be measured, the first processing module 32 sends the temperature data to the second wireless communication module (not shown) of the induction cooktop via the first wireless communication module 34, so that the second processing module of the induction cooktop adjust the magnitude of the alternating current flowing through the second inductance coil according to the temperature data of the object to be measured, thereby controlling the intensity of the magnetic field generated by the second inductance coil to control the heating power. In the case that the intensity of the magnetic field generated by the second inductance coil changes, the induced voltage generated by the first inductance coil 331 of the sensing device 30 will also change accordingly. Through the DC-DC transforming circuit 334, the induced voltage can be converted into a desired voltage value to provide a stable supply voltage for the sensing module 31, the first processing module 32, and the first wireless communication module 34. In this embodiment, the first processing module 32 may be a general-purpose low-power single chip microcomputer (MCU), and the first wireless communication module 34 and the second wireless communication module may use any of Bluetooth, infrared, NFC, ZigBee, mobile cellular network, and WiFi to communicate wirelessly.

As shown in FIG. 4, the sensing device 30 is of unitary structure and includes a hollow probe member 35 and a hollow handle member 36. The handle member 36 further includes a first housing 361 and a second housing 362. The first inductance coil 331 shown in FIG. 3 is accommodated in the second housing 362. In the present embodiment, the first inductance coil 331 may be a multi-turn metal wire winding surrounding a cylindrical or cubic shaped magnet core. The material of the second housing 362 may be a lightweight material such as silicone or plastic.

The first housing 361 is disposed with a bending portion 3611, as shown in FIG. 4, which is connected to the second housing 362, and the bending portion 3611 enables the probe member 35 and the second housing 362 to form an angle. The temperature measuring circuit 312, the first processing module 32, the first wireless communication module 34, the rectifying circuit 332, the filtering circuit 333 and the DC-DC transforming circuit 334 are disposed within the first housing 361, and are electrically connected through wires according to the connection manner described in FIG. 3. The first inductance coil 331 is electrically connected to the rectifying circuit 332 via a wire passing through the bending portion 3611. Similar to the second housing 362, the material of the first housing 361 may also be a lightweight material such as silicone or plastic.

In some other embodiments, the handle member 36 may have other shapes or structures. For example, the handle member 36 may only have one housing, and the first inductance coil 331, the temperature measuring circuit 312, the first processing module 32, the first wireless communication module 34, the rectifying circuit 332, the filtering circuit 333 and the DC-DC transforming circuit 334 are placed in the housing. As another example, the handle member 36 and the probe member 35 have an integral structure. In some other embodiments, the probe member 35 and the handle member 36 may be angled in other ways. For example, in the embodiment of FIG. 4, the first housing 361 is directly connected to the probe member 35 at an angle. As another example, in an embodiment where the handle member 36 has only one housing, the handle member 36 may be directly connected to the probe member 35 at an angle, or the handle member 36 may be provided with a bent shape. In some other embodiments, it may not be necessary to position the probe member 35 relative to the handle member 36 at an angle, for example, the handle member 36 extends in the length direction of the probe member 35.

As shown in FIG. 4, the first housing 361 is connected to the probe member 35. The shape of the probe member 35 helps to insert into the food being cooked or the cooking medium of the food. Temperature sensing element 311 is disposed within the probe member 35 so as to be led into the food being cooked or the cooking medium of the food via the probe member 35. Temperature sensing element 311 is connected electrically with the temperature measuring circuit 312 disposed within the first housing 361 via the wire passing through the probe member 35. The probe member 35 is in thermal conductive contact with the food being cooked or the cooking medium of the food, and the temperature sensing element 311 measures the temperature of the food being cooked or the cooking medium of the food via the heat transferred by the probe member 35. In the embodiment where there is more than one temperature sensing element 311, the temperature sensing elements 311 may be disposed at different locations of the probe member 35 along the longitudinal direction of the probe member 35 as needed, so as to measure the temperatures of different parts of the food respectively, or measure the temperatures of the food and its cooking medium respectively. In some embodiments, an indicating mark (for example, a scale) may also be provided on the outer surface of the probe member 35 to identify the positions of the different temperature sensing elements 311 so as to facilitate the user to observe the depth of insertion into the food. Since the probe member 35 requires good thermal conductivity, a material with good thermal conductivity such as metal or ceramic can be used as the material of the probe member 35.

Figure 5:
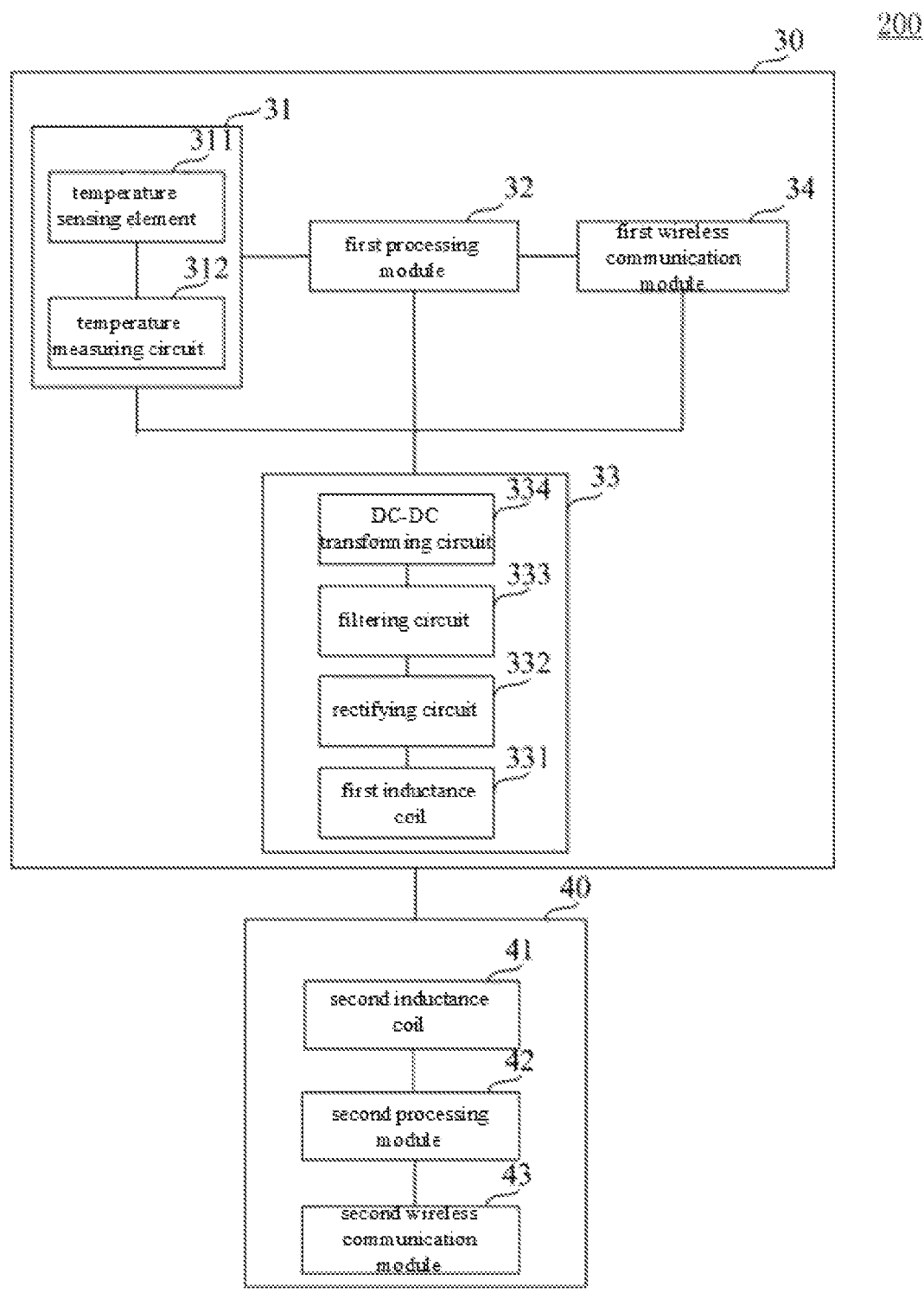
FIG. 5 is a block diagram of an electromagnetic device system according to an embodiment.

An electromagnetic device system according to an embodiment the present disclosure is now described with reference to FIGS. 5-7. FIG. 5 shows a circuit block diagram of an electromagnetic device system 200 according to an embodiment of the present disclosure, FIG. 6 shows a perspective view of an electromagnetic device system 200 according to an embodiment of the present disclosure, and FIG. 7 shows a side view of an electromagnetic device system 200 according to an embodiment of the present disclosure.

In the embodiment shown in FIGS. 5-7, the sensing device 30 of the electromagnetic device system 200 is the same as the sensing device 30 described with reference to FIGS. 3-4, and the electromagnetic device 40 is an induction cooktop used with the sensing device 30. Therefore, in this embodiment, various details of the sensing device 30 will not be described in detail. As shown in FIGS. 5-7, the induction cooktop 40 includes the second inductance coil 41, and a high frequency alternating current flows through the second inductance coil 41 to generate a high frequency alternating magnetic field, so as to heat a pot 50 placed thereon. The second processing module 42 of the induction cooktop 40 is coupled to the second inductance coil 41, to control the magnitude of the alternating current flowing through the second inductance coil 41. The sensing device 30 is placed within the pot 50 being heated by the induction cooktop 40 and is used to measure the temperature of the food being cooked in the pot 50 or the temperature of the cooking medium of the food.

Figure 6:
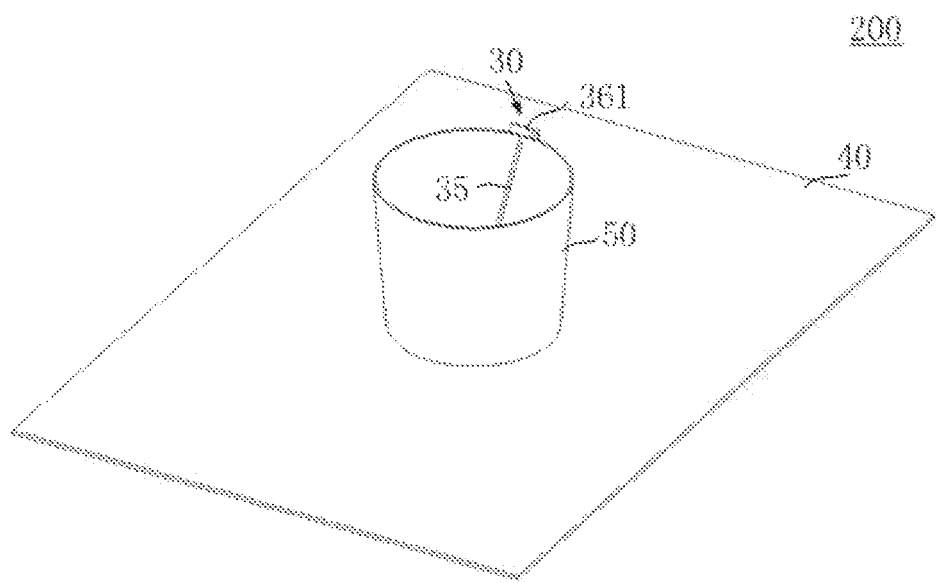
FIG. 6 is a perspective view of the electromagnetic device system of FIG. 5.
Figure 7:
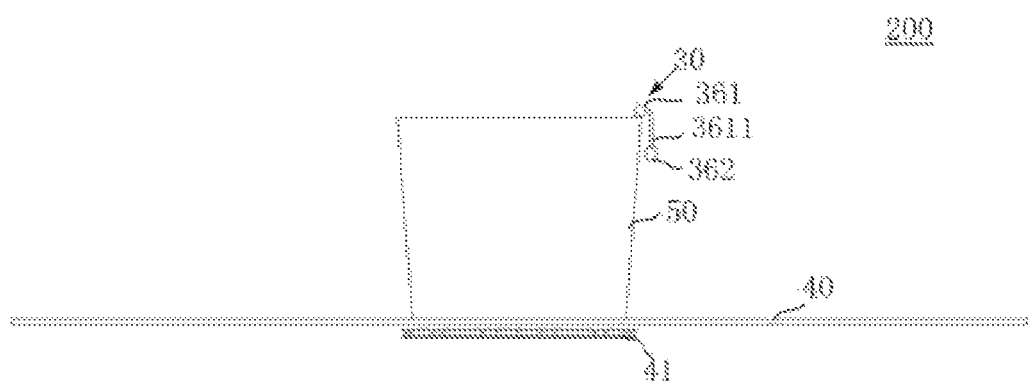
FIG. 7 is a side view of the electromagnetic device system of FIG. 5.

As shown in FIGS. 5-7, the connection portion of the probe member 35 and the first housing 361 rests on the upper edge of the pot when the sensing device 30 is placed within the pot 50. The bending portion 3611 of the first housing 361 extends downward along the outer surface of the pot 50, and the extending direction is substantially perpendicular to the upper surface of the induction cooktop 40. Thus, the bending portion 3611 enables the probe member 35 and the second housing 362 to form an angle, which enables the first inductance coil 311 accommodated within the second housing 362 is generally aligned with the second inductance coil 41 of the induction cooktop 40 when the sensing device 30 is placed within the pot 50. By providing the bending portion 3611, the sensing device 30 does not easily slide into the pot 50 when being placed in the pot 50. Further, the bending portion 3611 further enables the first inductance coil 311 of the sensing device 30 and the second inductance coil 41 of the induction cooktop 40 to be substantially aligned, such that the first inductance coil 331 can induce stronger magnetic field from the second inductance coil 41, and thus produce larger induced voltage. However, in other embodiments, the bending portion 3611 may not be provided, as long as the second housing 362 that accommodates the first inductance coil 331 is located outside the pot 50 without impact of the inductive coupling between the first inductance coil 331 and the second inductance coil 41 due to the magnetic shielding effect of the pot 50 when the sensing device 30 is placed within the pot 50.

Returning back to FIG. 5, after the sensing module 31 of the sensing device 30 senses the temperature of the food being cooked in the pot or the cooking medium of the food, the sensing module 31 sends the temperature to the first processing module 32 of the sensing device 30. Subsequently, the first processing module 32 sends the temperature data sensed by the sensing module 31 to the second processing module 42 of the induction cooktop 40 via the wireless communication between the first wireless communication module 34 and the second wireless communication module 43 of the induction cooktop 40. The second processing module 42 performs corresponding control operations according to the received temperature data. In this embodiment, the second processing module 42 adjusts the magnitude of the alternating current flowing through the second inductance coil 41 according to the temperature data, thereby controls the intensity of the magnetic field generated by the second inductance coil 41 to change the heating power. For example, if the current temperature data is less than the preset threshold, which indicates that more heating power is needed, then the second processing module 42 makes the alternating current flowing through the second inductance coil 41 larger, and the intensity of the generated magnetic field also becomes larger, and vice versa. In the case that the intensity of the magnetic field generated by the second inductance coil 41 changes, the induced voltage produced by the first inductance coil 331 of the sensing device 30 will also change accordingly. Through the DC-DC transforming circuit 334, the induced voltage can be converted into a desired supply voltage value to provide a stable supply voltage for the sensing module 31, the first processing module 32, and the first wireless communication module 34.

However, in other embodiments, the second processing module 42 may also perform other operations according to the received temperature data. For example, instead of adjusting the alternating current flowing through the second inductance coil 41, the second processing module 42 sends a visual/audible alarm/warning, shows the comparison result and the recommended operations on the display interface of the induction cooktop, or pushes relevant messages to the client of the handheld device or smartphone via a server, and so on, in accordance with the comparison result between the temperature data and the preset threshold.

According to the sensing device and the electromagnetic device system including the same proposed by the present disclosure, the power module of the sensing device may produce a supply voltage based on the magnetic field of the electromagnetic device to power the sensing module and the first processing module, and thus a power supply voltage can be provided without any built-in battery or connection with the power supply, which avoids the safety and limitations brought by using the battery and increases convenience. In addition, by using the magnetic field generated by the electromagnetic device during the heating process to produce the supply voltage, there is no need to add an additional power source (for example, a radio frequency apparatus) or modify the original coil of the electromagnetic device at the electromagnetic device. Therefore, there is no additional cost, and also additional electromagnetic radiation will not be induced and thus a good electromagnetic compatibility is achieved.

The foregoing contents are only optional embodiments of the embodiments of the present disclosure, and are not intended to limit the embodiments of the present disclosure. For those skilled in the art, the embodiments of the present disclosure may have various modifications and changes. Any modification, equivalent replacement, improvement, etc. within the spirit and principle of the embodiments of the present disclosure should be included in the protection scope of the embodiments of the present disclosure.

Although the embodiments of the present disclosure have been described with reference to several specific embodiments, it should be understood that the embodiments of the present disclosure are not limited to the disclosed specific embodiments. The embodiments of the present disclosure are intended to cover various modifications and equivalent arrangements included within the spirit and scope of the appended claims. The scope of the claims conforms to the broadest interpretation and thus includes all such modifications and equivalent structures and functions.

What is claimed is:

1. A sensing device, comprising:
   a sensing module configured to obtain a measurement data of an object to be measured;
   a first processing module coupled to the sensing module and configured to receive the measurement data of the object to be measured from the sensing module; and
   a power module coupled to the sensing module and the first processing module, including:
   a first inductance coil;
   a rectifying circuit operatively connected to an output of the first inductance coil;
   a filtering circuit operatively connected to an output of the rectifying circuit; and
   a DC-DC transforming circuit operatively connected to an output of the filtering circuit, the power module configured to produce a supply voltage based on a magnetic field generated by an electromagnetic device and processed by a signal processing unit before powering the sensing module and the first processing module.

2. The sensing device of claim 1, wherein the magnetic field is generated by the electromagnetic device while heating the object to be measured.

3. The sensing device of claim 1, wherein the electromagnetic device includes a second inductance coil energized to generate the magnetic field, the first inductance coil is inductively coupled with the second inductance coil to produce the supply voltage.

4. The sensing device of claim 1, further comprising a first communication module coupled to the first processing module and the power module and powered by the supply voltage, the first communication module configured to receive the measurement data of the object to be measured from the first processing module and send the measurement data to a second communication module.

5. The sensing device of claim 4, wherein the electromagnetic device is configured to generate the magnetic field while heating the object to be measured, the electromagnetic device includes:
the second communication module configured to receive the measurement data of the object to be measured from the first communication module; and
a second processing module coupled to the second communication module, the second pressing module is configured to receive the measurement data of the object to be measured from the second communication module and adjust an intensity of the magnetic field based on the measurement data to control a heating level of the object to be measured.

6. The sensing device of claim 4, wherein the first communication module and the second communication module are wireless communication modules.

7. The sensing device of claim 1, wherein the sensing module includes at least one sensing element.

8. The sensing device of claim 1, wherein the measurement data of the object to be measured is temperature data of the object to be measured.

9. The sensing device of claim 1, wherein the sensing device is a stand-alone sensing device.

10. The sensing device of claim 1, further comprising:
a probe member at least partially accommodating the sensing module; and
a handle member, including:
a first housing connected to the probe member and at least partially accommodating the first processing module and the power module; and
a second housing connected to the first housing via an elongated bending portion of the handle member, the bending portion forming an angle between the probe member and the second housing, the first inductance coil of the power module disposed within the second housing and operatively connected to the power module through the bending portion.

11. The sensing device of claim 10, wherein the rectifying circuit, the filtering circuit, the DC-DC transforming circuit, and a temperature measuring circuit of the sensing module are arranged within the first housing.

12. The sensing device of claim 10, wherein the bending portion comprises two discrete legs extending between the first housing and the second housing, each of the legs including a first segment extending from the first housing in a first direction and a second segment extending between an end of the first segment and the second housing in a second direction.

13. A sensing device, comprising:
a sensing module configured to obtain a measurement data of an object to be measured;
a first processing module coupled to the sensing module and configured to receive the measurement data of the object to be measured from the sensing module;
a power module coupled to the sensing module and the first processing module, the power module including a first inductance coil and configured to produce a supply voltage based on a magnetic field generated by an electromagnetic device so as to power the sensing module and the first processing module;
a probe member configured to at least partially accommodate the sensing module; and
a handle member, including:
a first housing connected to the probe member and at least partially accommodating the first processing module, the first housing at least partially accommodating the power module, the first housing including a bending portion; and
a second housing connected to the first housing via the bending portion and at least partially accommodating the power module, the first inductance coil disposed within the second housing, the bending portion forming an angle between the probe member and the second housing, the first inductance coil and a second inductance coil are substantially aligned allowing the first inductance coil to induce a stronger magnetic field from the second inductance coil.

14. The sensing device of claim 13, wherein the magnetic field is generated by the electromagnetic device while heating the object to be measured.

15. The sensing device of claim 13, wherein the electromagnetic device includes the second inductance coil energized to generate the magnetic field, the first inductance coil is inductively coupled with the second inductance coil to produce the supply voltage.

16. The sensing device of claim 13, wherein the sensing device includes a first communication module coupled to the first processing module and the power module and powered by the supply voltage, the first communication module is configured to receive the measurement data of the object to be measured from the first processing module.

17. The sensing device of claim 13, wherein the sensing module includes a temperature sensing element and a temperature sensing circuit operatively connected to the first processing module.

18. The sensing device of claim 17, wherein the first processing module controls a frequency of temperature sensing of the sensing module.

19. The sensing device of claim 17, wherein the temperature measuring circuit and the first processing module are arranged within the first housing, and the temperature sensing element is arranged within the probe member.

20. The sensing device of claim 19, further comprising a first wireless communication module arranged within the first housing.

21. The sensing device of claim 19, wherein the power module includes a rectifying circuit operatively connected to the first inductance coil, a filtering circuit operatively connected to the rectifying circuit, and a DC-DC transforming circuit operatively connected to the filtering circuit.

22. The sensing device of claim 21, wherein the rectify circuit, the filtering circuit and the DC-DC transforming circuit are arranged within the first housing.

23. The sensing device of claim 21, wherein the first inductance coil is electrically connected to the rectifying circuit via at least one wire passing through the bending portion.

24. The sensing device of claim 23, wherein the bending portion includes two discrete legs extending between the first housing and the second housing, wherein the at least one wire is arranged through at least one of the two legs.

25. The sensing device of claim 13, wherein the bending portion forms an angle of less than 90 degrees between the probe member and the second housing.

26. A sensing device, comprising:
    a probe member;
    a handle member, including:
        a first housing connected to the probe member;
        a second housing; and
        an elongated bending portion connecting the first housing to the second housing, including:
            a first segment extending from the first housing in a first direction; and
            a second segment extending between an end of the first segment and the second housing in a second direction, the first and second segments forming an angle between the probe member and the second housing;
    a sensing module obtaining measurement data, including:
        a temperature sensing element arranged within the probe member; and
        a temperature measuring circuit arranged within the first housing;
    a first processing module at least partially arranged within first housing and coupled to the sensing module, the first processing module receiving the measurement data from the sensing module; and
    a power module coupled to the sensing module and the first processing module, the power module including:
        a first inductance coil arranged within the second housing and adapted to produce a supply voltage based on a magnetic field generated by an electromagnetic device so as to power the sensing module and the first processing module;
        a rectifying circuit arranged within the first housing and operatively connected to an output of the first inductance coil via at least one wire passing through the first and second segments of the bending portion;
        a filtering circuit arranged within the first housing and operatively connected to an output of the rectifying circuit; and
        a DC-DC transforming circuit arranged within the first housing and operatively connected to an output of the filtering circuit.

\* \* \* \* \*